United States Patent
Lee et al.

(10) Patent No.: US 8,631,331 B2
(45) Date of Patent: Jan. 14, 2014

(54) APPARATUS FOR NETWORK TRAFFIC CLASSIFICATION BENCHMARK

(75) Inventors: Su Chul Lee, Seoul (KR); Sung Ryoul Lee, Seoul (KR); Hyun Chul Kim, Busan (KR); Chong Kwon Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 591 days.

(21) Appl. No.: 12/895,159

(22) Filed: Sep. 30, 2010

(65) Prior Publication Data

US 2011/0093785 A1    Apr. 21, 2011

(30) Foreign Application Priority Data

Oct. 16, 2009   (KR) .................. 10-2009-0098817

(51) Int. Cl.
   *G06F 3/01*      (2006.01)
   *G06F 15/16*    (2006.01)
(52) U.S. Cl.
   USPC ........................................ 715/736; 715/738

(58) Field of Classification Search
   USPC .................................................. 715/736, 738
   See application file for complete search history.

(56) References Cited

U.S. PATENT DOCUMENTS

2005/0193258 A1* 9/2005 Sutton .............................. 714/32
2005/0249125 A1* 11/2005 Yoon et al. .................... 370/252

FOREIGN PATENT DOCUMENTS

KR       1020040052015 A      6/2004

* cited by examiner

*Primary Examiner* — Andrea Leggett

(57) ABSTRACT

The present invention relates to a network management system for analyzing Internet application traffic. An apparatus for Internet application traffic classification benchmark according to the present invention configures two or more Internet application traffic classifications in plug-in scheme to perform a benchmarking function for the performance of each Internet application traffic classification. The apparatus can provide an objective and accurate evaluation for each classification technology by aggregating various Internet application traffic classification technologies by the plug-in scheme.

20 Claims, 6 Drawing Sheets

APPARATUS FOR NETWORK TRAFFIC CLASSIFICATION BENCHMARK

CROSS-REFERENCE TO RELATED APPLICATIONS

This application claims priority under 35 U.S.C. §119 to Korean Patent Application No. 10-2009-98817, filed on Oct. 16, 2009, in the Korean Intellectual Property Office, the disclosure of which is incorporated herein by reference in its entirety.

TECHNICAL FIELD

The present invention relates to a network management system for analyzing Internet application traffic, and more particularly, to a technology capable of rapidly analyzing Internet traffic conditions and fairly evaluating Internet application traffic identification and classification technologies by benchmarking various known Internet application traffic identification and classification technologies.

BACKGROUND

In recent years, with the rapid increase of Internet use, Internet service suppliers, researchers, and administrators require a system capable of checking network conditions rapidly and accurately.

Therefore, various Internet application traffic identification and classification systems are proposed.

There are some known traffic classification systems, which include port-based classification, Deep Packet (Payload) Inspection (DPI), host-behavioral classification, and statistical approaches based on machine learning.

In the early Internet, the traffic classification largely relied on the use of transport layer port numbers. Port-based classification has been found to be less reliable since many applications hide their identity by masquerading ports and/or by using well-known ports of other application.

DPI technique looks at the packet payload to classify traffic as many applications write their signatures in the first few bytes in the payload. Given a set of unique payload signatures, DPI is more reliable and accurate. DPI is resource-intensive and futile on encrypted traffic. Additionally, DPI causes privacy and legal concerns.

Host-behavioral classifications inspect "social interaction" for classification. It shows excellent performance in identification and classification of viruses and worms that the known methods cannot easily handle, but is low in accuracy due to heuristic-based classification.

Machine learning-based method has comparatively high accuracy and a rapid execution time, but has classification and identification accuracy which depends on application traffic itself.

As described above, since the performances of the Internet application traffic identification and classification systems are limitatively evaluated, it is difficult to determine the type of the traffic classification method executable with the best performance, suitability of traffic analysis, and verification of reliability while a fair and objective evaluation reference is not provided at the time of applying each traffic classification method.

SUMMARY

An apparatus for network traffic classification benchmark of the present invention configures two or more Internet application traffic classifications in plug-in scheme to perform a benchmark function for the performance of each Internet application traffic classification.

In a general aspect of the present invention, an apparatus for network traffic classification benchmark, comprises: a user interface inputting Internet application traffic trace data of a user constituted by on-line traffic through a network interface card (NIC) and off-line traffic through a Raw file stored in a local or a remote disk, and providing computation data computed by performance evaluation and classification result of a Internet application traffic classification; a pre/post-processor connected with the user interface to convert the input data into a format suitable for each of a plurality of classification plug-ins, and compare and evaluate the performances of the plug-ins; a traffic classifier connected with the pre/post-processor to manage and execute each plug-in configured to each network traffic classification; and a storage connected with the user interface and the traffic classifier to store performance analysis results depending on an execution of the plug-in, wherein the classifier includes, a classification execution unit identifying and classifying applications related to transaction flow; a plug-in management unit connected with the classification execution unit to allocate two or more network traffic classifications to the plug-ins, and to add, modify, and remove the plug-in; and a database management unit connected with the plug-in management unit to manage data of the storage and enable storing or accessing a plurality of records sequentially or randomly.

Other features and aspects will be apparent from the following detailed description, the drawings, and the claims.

DETAILED DESCRIPTION OF EMBODIMENTS

Figure 1:
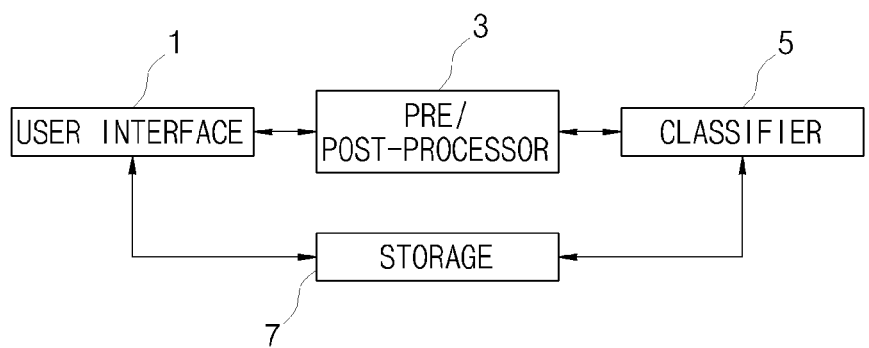
FIG. 1 is a diagram showing a structure of an Internet application traffic classification and benchmarks framework according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an Internet application traffic classification and benchmarks framework according to an exemplary embodiment of the present invention will be described in detail.

In the Internet application traffic classification and benchmarks framework according to the exemplary embodiment of the present invention, two or more Internet application traffic classification methods are configured in plug-in scheme and a benchmark function for each Internet application traffic classification method is performed.

FIG. 1 is a diagram showing a structure of an Internet application traffic classification and benchmarks framework according to an exemplary embodiment of the present invention and includes a user interface 1, a pre/post-processor 3, a traffic classifier 5, and a storage 7.

Figure 2:
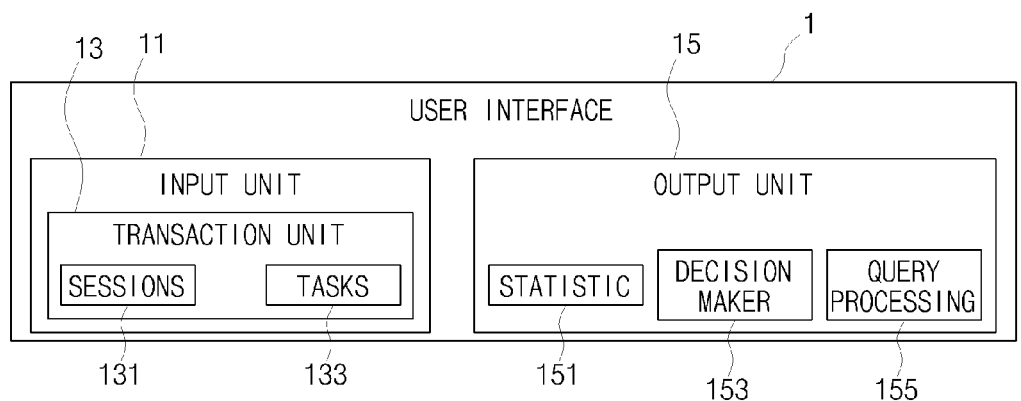
FIG. 2 is a diagram showing a detailed structure of a user interface of an Internet application traffic classification and benchmarks framework according to an exemplary embodiment of the present invention.

The user interface 1 serves to provide operation data computed from evaluation and classification results of the performance of an Internet application traffic classification method depending on user's input of Internet application traffic trace data and includes an input unit 11, and an output unit 15 as shown in FIG. 2.

Figure 6A:
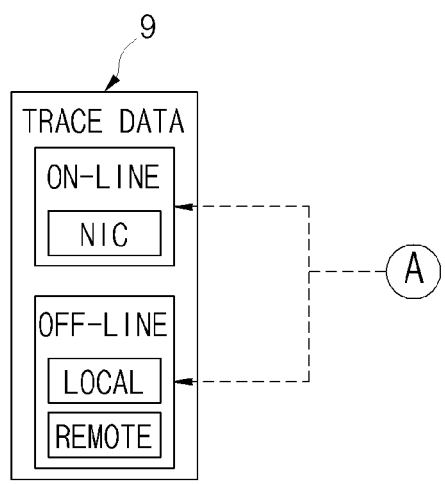
FIG. 6A through FIG. 6C are a flowchart of an overall system of an Internet application traffic classification and benchmarks framework according to an exemplary embodiment of the present invention.
Figure 6B:
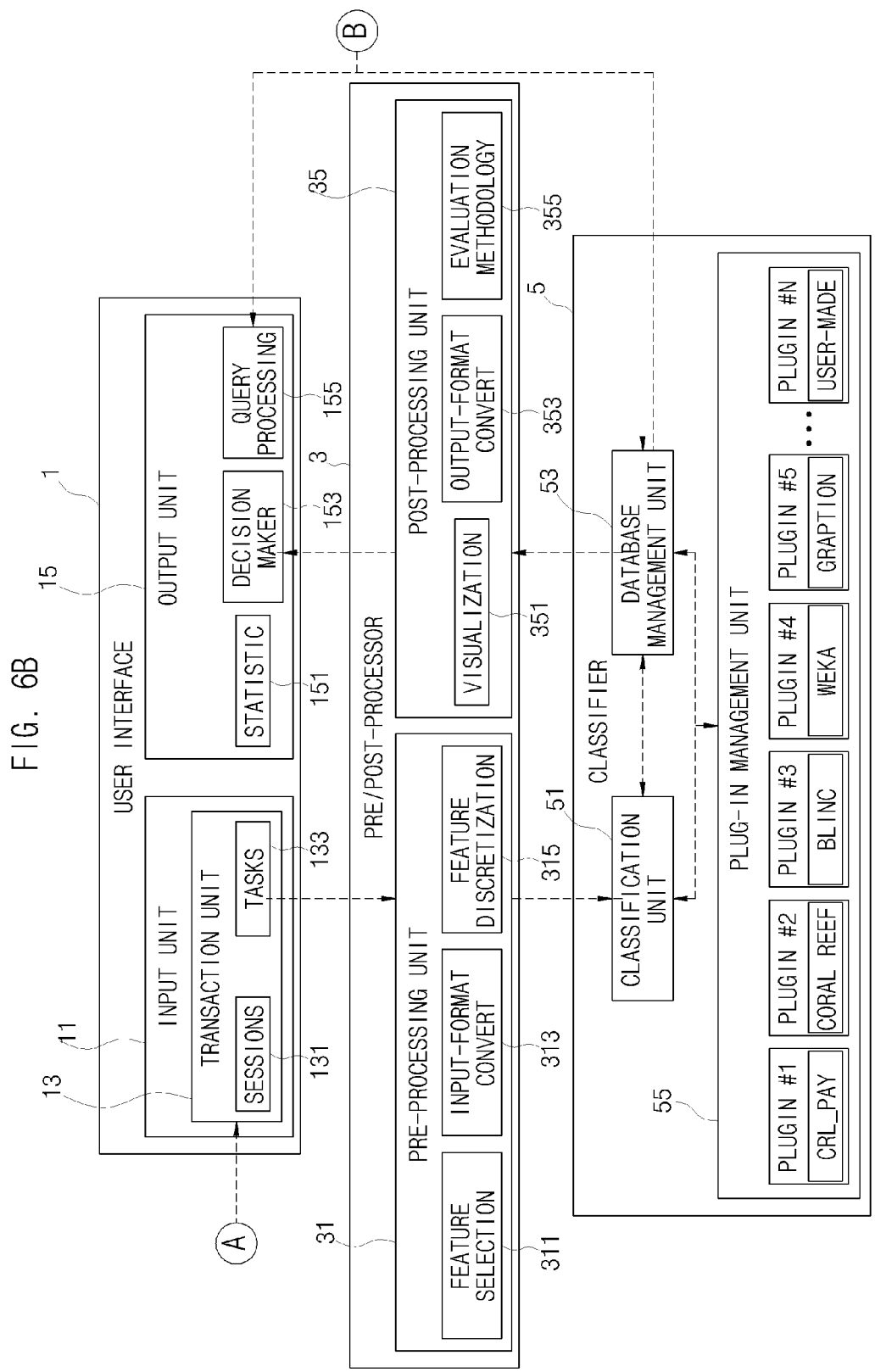
Figure 6C:
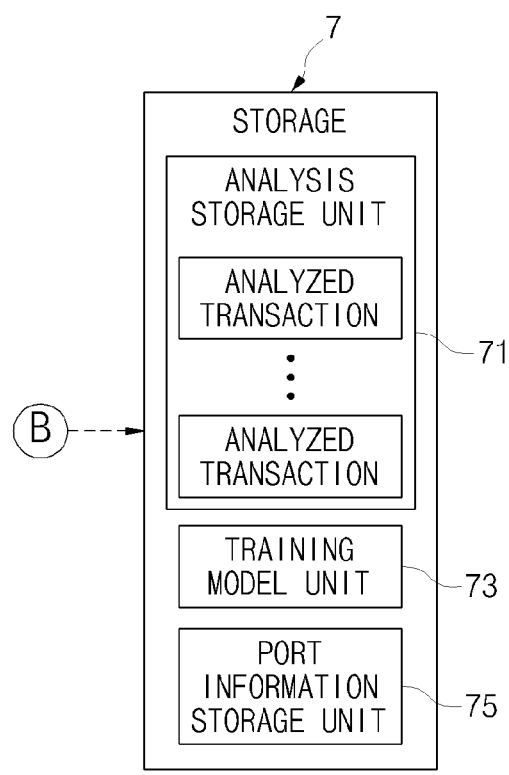

The input unit 11 serves to input analysis data by capturing the Internet application traffic trace data constituted by two kinds of Internet application traffic trace data 9 such as online traffic 91 through a network interface card (NIC) and offline traffic 93 through a raw file stored in a local or a remote disk like an overall flowchart shown in FIG. 6A through FIG. 6C.

Further, the input unit 11 according to the exemplary embodiment of the present invention includes a transaction unit 13 that is configured in a transaction scheme in which input data is separated into an object constituted by a session, a task, a time stamp, and an analysis result.

Since each Internet application traffic classification method should process a set of Internet application traffic trace data of a large amount, system efficiency depends on a data operation unit.

The Internet application traffic classification and benchmarks framework according to the exemplary embodiment of the present invention identifies and classifies the Internet application traffic by the transaction unit separated into a basic operation unit in order to provide a smooth operation function within limited resources of a CPU and a memory.

In the exemplary embodiment of the present invention, the basic operation unit is separated into a compact object constituted by a session and tasks defined JAVA, a time stamp, and an analysis result, that is, a transaction.

The session 131 is defined as a record set associated with an Internet application traffic flow captured for a unit time (five minutes in the exemplary embodiment of the present invention).

Each record of the session includes information associated to the Internet application traffic flow including an IP, a port, and a protocol, a space allocated to each plug-in for recording a classification result, and a descriptor of the session.

The tasks 133 are defined as a batch of the plug-in which can be executed while the Internet application traffic classification and benchmarks framework according to the exemplary embodiment of the present invention operates.

The time stamp is defined as a unique identifier of the transaction in which a system time is recorded at the time of generating the transaction.

The analysis result includes accuracy and efficiency of each plug-in as a result of a benchmark of a plug-in which is scheduled to be executed.

All stems according to the exemplary embodiment of the present invention are stored in a database as a single table.

By applying such a transaction concept, collection and separation are available by the flow of a large amount from a single or multiple source trace, an analysis transaction can be reloaded without an additional computation operation, and the extensibility of a classification system can be provided.

The analysis data inputted by the input unit 11 is transferred to a pre-processing unit 31 of the pre/post-processing unit 3.

Figure 3:
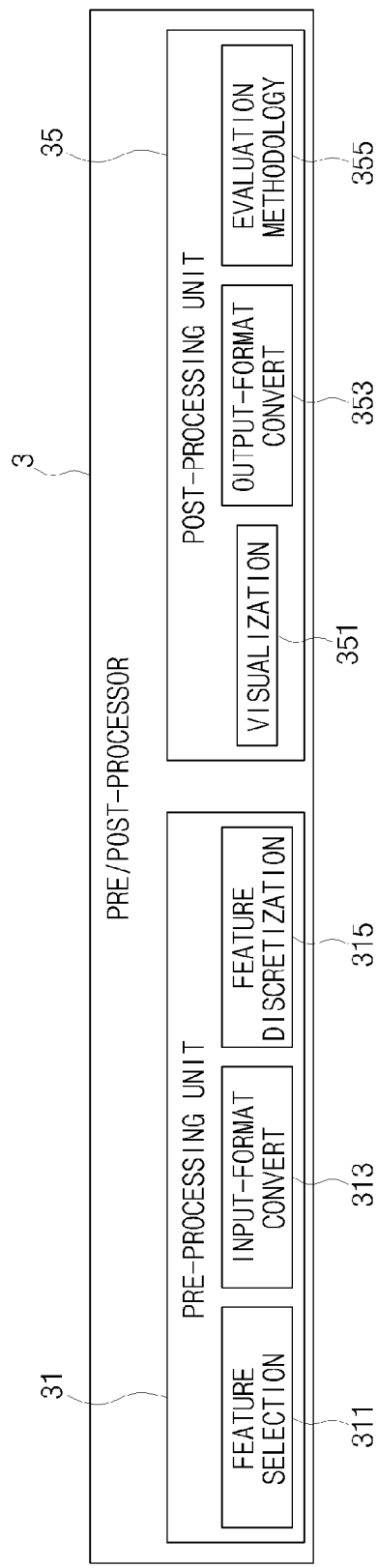
FIG. 3 is a diagram showing a detailed structure of a pre/post-processor of an Internet application traffic classification and benchmarks framework according to an exemplary embodiment of the present invention.

The pre/post-processor 3 includes the pre-processing unit 31 and a post-processing unit 35 as shown in FIG. 3 and the pre-processing unit 31 serves to convert the input data of the input unit 11 into a format for each classification plug-in and includes an input format converting unit 313, a feature selecting unit 311, and a feature discretizing unit 315.

The input format converting unit 313 is connected with the input unit 11 and serves to convert an input format of the plug-in.

That is, a record in the transaction table is required to be extracted or updated in order to convert the transaction into input formats of a plurality of plug-ins (i.e., an .AREF format for WEKA which is the machine learning-based application traffic classification method).

The input format converting procedure can be implemented by a configuration linking an input stream of each plug-in and an output stream of the database with each other.

The feature selection unit 311 is connected with the input format converting unit 313 and serves to select the feature of the Internet application traffic flow to be used for machine learning. Since the performance of a machine learning-based Internet application traffic classification algorithm is generally influenced by deliberately selecting the feature, the feature selecting unit 311 preferably selects a feature that has the most influence on accuracy.

Therefore, the feature is arbitrarily selected according to a user's intention through a conditional selection statement implemented by 37 basic features in the exemplary embodiment of the present invention.

The feature discretizing unit 315 is connected to the input format converting unit 313 and serves to discretize data.

The data discretization is defined as a process transitioning continuous data into discrete data.

The data processed by the pre-processing unit 31 is transferred to the traffic classifier 5.

Figure 4:
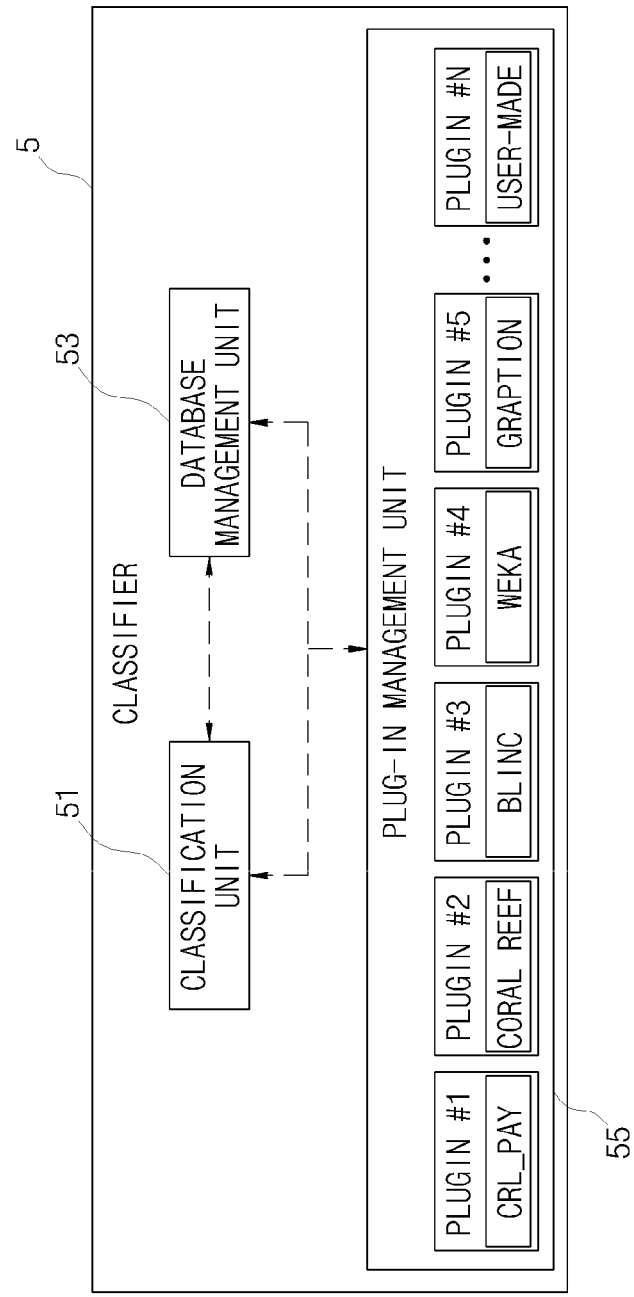
FIG. 4 is a diagram showing a detailed structure of a classification unit of an Internet application traffic classification and benchmarks framework according to an exemplary embodiment of the present invention.
Figure 5:
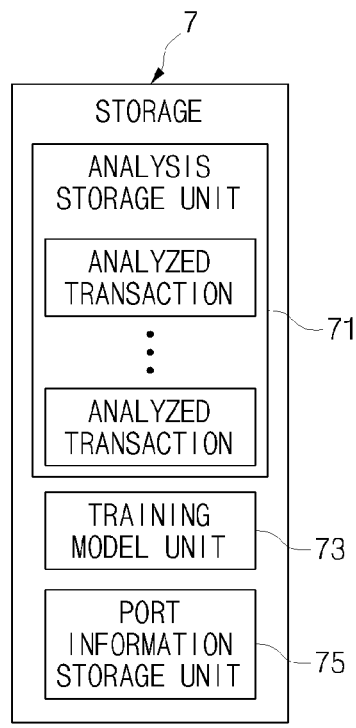
FIG. 5 is a diagram showing a detailed structure of a storage of an Internet application traffic classification and benchmarks framework according to an exemplary embodiment of the present invention.

The traffic classifier 5 manages and executes a plug-in configured by each Internet application traffic classification method and as shown in FIG. 4, is generally constituted by a classification execution unit 51, a plug-in management unit 55, and a database management unit 53.

The classification execution unit 51 identifies and classifies an application related with an Internet application traffic flow record of each transaction.

In order to perform these functions, each plug-in is loaded and executed in a task of the transaction in accordance with a predetermined order. In a preprocessed transaction, each plug-in is executed under a control by the plug-in management unit 55 through the connection between the plug-in and the database management unit 53.

The plug-in management unit 55 is connected with the classification execution unit 51 to allocate the classification technologies and facilitate the addition, modification, and removal of the plug-in.

More specifically, the plug-in management adds a new technology to an object for classification or bench-mark and reconfigures classification technologies added according to a user's purpose. The plug-in management takes charge of all allocation operations for the classification technologies.

In the exemplary embodiment of the present invention, the plug-in management is implemented by JAVA and a class-based data structure is processed as a plug-in name, details of the plug-in, a plug-in execution parameter, and an executable library link.

Furthermore, all plug-in management functions are supported by the user interface in order to improve usability to enable the user to add, modify, and remove the plug-in in a semi-automated scheme through a simple operation.

The database management unit 53 is connected with the plug-in management unit 55 to manage the data of the storage and enable sequential access or random access to a lot of records.

An operation processed by the transaction of the Internet application traffic classification and benchmarks framework according to the exemplary embodiment of the present invention requires a lot of consumption resources such as a memory, a disk space, and the like. Therefore, when the transaction is configured in the exemplary embodiment of the present invention, each Internet application traffic flow in the session is stored as a relevant single record of the transaction table of the database management unit and all data such as the space allocated to each plug-in, the session descriptor, and the like are included in the transaction table in order to record flow information and a classification result.

The data processed by the traffic classifier 5 is transferred to the post-processing unit 35 of the pre/post-processor 3.

The post-processing unit 35 evaluates the transaction accurately classified for each plug-in and includes a visualization unit 351, an output format converting unit 353, and an evaluation unit 355.

The visualization unit 351 visualizes the classification result of the traffic classifier 5.

The output format converting unit 353 is connected with the visualization unit 351 to convert the analyzed transaction into a visualized format.

The evaluation unit 355 is connected with the output format converting unit 355 to evaluate the analyzed transaction by using performance metric for each plug-in.

The Internet application traffic classification and benchmarks framework according to the exemplary embodiment of the present invention employs a benchmark methodology enabling the comparison of a plurality of Internet application traffic classification technologies. In order to implement the benchmark system, first, the transaction should be evaluated by using an objective and accurate performance metric, second, a complete payload data set should be used, and third, a wide-range application category should be defined.

In the exemplary embodiment of the present invention, the performance metric uses four metrics, i.e., overall accuracy, precision, recall, and F-measure in order to measure the performance of each Internet application traffic classification technology.

The performance metrics may be defined as true positive (TP), false positive (FP), true negative (TN), and false negative (FN).

The true positive (TP) is defined by the number of Internet application traffic flows accurately classified for a predetermined application, the false positive (FP) is defined by the number of Internet application traffic flows inaccurately belonging to a given application, the true negative (TN) is defined by the number of Internet application traffic flows accurately classified into another application, and the false negative (FN) is defined by the number of Internet application traffic flows inaccurately classified into another application.

More specifically, it will be identified whether or not the Internet application traffic flow is a predetermined application. For example, it will be identified whether or not the relevant application of the Internet application traffic flow called A is web.

In the case in which the Internet application traffic flow A is actually the web, when the Internet application traffic classification method classifies the application related to the flow A as the 'web', this is determined as the true positive (TP). However, when the Internet application traffic classification method classifies the application related to the flow A as not the 'web', this is determined as the false negative (FN).

Contrary to this, in the case in which the Internet application traffic flow A is not actually the web, when the Internet application traffic classification method classifies the application related to the flow A as the 'web', this is determined as the false positive (FP). However, when the Internet application traffic classification method classifies the application related to the flow A as not the 'web', this is determined as the true negative (TN).

The overall accuracy represents the accuracy of the plug-in for the entire trace set and represents a ratio of the sum of overall true positive to the sum of the overall true positive (TP) and the false positive (FP) for all classes, and is defined by the following equation:

$$F\text{-measure} = \frac{2 X accuracy X \text{ recall}}{(\text{accuracy} + \text{recall})} \qquad \text{[Equation 1]}$$

The precision as the performance metric of the Internet application traffic classification method for a predetermined Internet application category is calculated by a ratio of the true positive (TP) to the sum of the true positive (TP) and the false positive (FP) among the Internet application traffic flows and may be expressed by the following equation:

$$\text{Accuracy} = \frac{TP}{TP + FP} \qquad \text{[Equation 2]}$$

The recall as the performance metric of the Internet application traffic classification method for a predetermined Internet application category is calculated by a ratio of the true positive (TP) to the sum of the true positive (TP) and the false negative (FN) among the Internet application traffic flows and may be expressed by the following equation:

$$\text{Recall} = \frac{TP}{TP + FN} \qquad \text{[Equation 3]}$$

The F-measure considers the precision and the recall by taking a harmonic means and as metric widely used in retrieving and classifying information, may be expressed by the following equation:

$$F\text{-measure} = \frac{2 X accuracy X recall}{(accuracy + recall)} \qquad \text{[Equation 4]}$$

Since the evaluation result processed by the post-processing unit 35 is stored in the storage 7, the evaluation result may be queried by a query unit 155 of the output unit 15.

In the query method in the exemplary embodiment of the present invention, since all Internet application traffic flow records are stored in the storage 7 when the transaction is generated, important information including a key IP address, and the like may be queried by only a small overhead.

In the exemplary embodiment of the present invention, the output unit 15 includes a statistics unit 151, a behavioral pattern of the host may be verified by a graph module and the overall precision for each plug-in may be verified.

Further, the output unit 15 includes a determination unit 153 and may provide a plurality of determination processes by voting the priority of the performance of the Internet traffic classification method.

According to the exemplary embodiment of the present invention, in the priority voting algorithm, a priority value may be configurable in order to adjust the voting algorithm.

As set forth above, according to an exemplary embodiment of the present invention, an Internet application traffic classification and benchmarks framework that can provide an accurate network traffic condition analysis result and furthermore, improve the efficiency of operation of an Internet network by integrating various Internet application traffic classification technologies in a plug-in scheme to provide a system capable of objectively and accurately evaluating classification technologies.

It is possible to complementarily analyze the Internet application traffic by actively utilizing advantages of various Internet application traffic classification technologies and providing a framework having excellent extensibility.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for network traffic classification benchmark, comprising:
a user interface inputting Internet application traffic trace data of a user constituted by on-line traffic through a network interface card (NIC) and off-line traffic through a Raw file stored in a local or a remote disk, and providing computation data computed by performance evaluation and classification result of a Internet application traffic classification;
a pre/post-processor connected with the user interface to convert the input data into a format suitable for each of a plurality of classification plug-ins, and compare and evaluate the performances of the plug-ins;
a traffic classifier connected with the pre/post-processor to manage and execute each plug-in configured to each network traffic classification; and
a storage connected with the user interface and the traffic classifier to store performance analysis results depending on an execution of the plug-in,
wherein the classifier includes,
a classification execution unit identifying and classifying applications related to transaction flow;
a plug-in management unit connected with the classification execution unit to allocate two or more network traffic classification plug-ins, and to add, modify, and remove the plug-in; and
a database management unit connected with the plug-in management unit to manage data of the storage and enable storing or accessing a plurality of records sequentially or randomly.

2. The apparatus of claim 1, wherein the user interface includes:
an input unit inputting analysis data by capturing on-line and off-line Internet application traffic trace data; and
an output unit connected with the input unit to provide the computation data computed by the performance evaluation and the classification result to the user,
wherein the input unit classifies the input data into a session, a task, a timestamp, and an analysis result in a transaction scheme.

3. The apparatus of claim 2, wherein the output unit includes:
a statistics unit analyzing the performance and computation data of each Internet application traffic classification;
a determination unit connected with the statistics unit to provide determination process by voting a priority of the Internet application traffic classification; and
a query unit querying performance of the Internet application traffic classification.

4. The apparatus of claim 3, wherein the pre/post-processor includes:
a pre-processing unit converting the input data of the input unit into a format for each classification plug-in; and
a post-processor evaluating a transaction classified for each plug-in by accuracy.

5. The apparatus of claim 4, wherein the pre-processing unit includes:
an input format converting unit connected with the input unit to convert an input format of the plug-in;
a feature selecting unit connected with the input format converting unit to select a feature of a traffic flow; and
a feature discretizing unit connected with the feature selecting unit to change continuous data to discrete data.

6. The apparatus of claim 4, wherein the post-processor includes:
a visualization unit visualizing the classification result;
an output format converting unit connected with the visualization unit to convert the analyzed transaction into a visualized format; and
an evaluation unit connected with the output format converting unit to evaluate the analyzed transaction by using performance metric for each plug-in.

7. An apparatus for network traffic classification benchmark, comprising:
a user interface inputting Internet application traffic trace data of a user constituted by on-line traffic through a network interface card (NIC) and off-line traffic through a Raw file stored in a local or a remote disk, and providing computation data computed by performance evaluation and classification result of a Internet application traffic classification, wherein the user interface includes
an input unit inputting analysis data by capturing on-line and off-line Internet application traffic trace data, wherein the input unit classifies the input data into a session, a task, a timestamp, and an analysis result in a transaction scheme, and an output unit connected with the input unit to provide the computation data computed by the performance evaluation and the classification result to the user, wherein the output unit includes
- a statistics unit analyzing the performance and computation data of each Internet application traffic classification,
- a determination unit connected with the statistics unit to provide determination process by voting a priority of the Internet application traffic classification, and
- a query unit querying performance of the Internet application traffic classification;

a pre/post-processor connected with the user interface to convert the input data into a format suitable for each of a plurality of classification plug-ins, and compare and evaluate the performances of the plug-ins, wherein the pre/post processor includes
- a pre-processing unit converting the input data of the input unit into a format for each classification plug-in, and
- a post-processor evaluating a transaction classified for each plug-in by accuracy, wherein the post-processor includes
  - a visualization unit visualizing the classification result,
  - an output format converting unit connected with the visualization unit to convert the analyzed transaction into a visualized format, and
  - an evaluation unit connected with the output format converting unit to evaluate the analyzed transaction by using performance metric for each plug-in, wherein the performance metric includes
    - overall accuracy representing the accuracy of the plug-in for an entire trace set and calculated by a ratio of the sum of overall true to the sum of the overall true positive (TP) and the false positive (FP) for all Internet application classes,
    - precision representing the performance metric of the Internet application traffic classification method for a predetermined Internet application category and calculated by a ratio of the true positive (TP) to the sum of the true positive (TP) and the false positive (FP) among the Internet application traffic flows,
    - recall representing the performance metric of the Internet application traffic classification method for a predetermined Internet application category and calculated by a ratio of the true positive (TP) to the sum of the true positive (TP) and the false negative (FN) among the Internet application traffic flows, and
    - F-measure considers calculated by double-multiplying the precision and the recall with respect to a sum of the precision and the recall by taking a harmonic means,
    - wherein the true positive (TP) is defined as a number of Internet application traffic flows accurately classified for a predetermined application,
    - the false positive (FP) is defined as a number of Internet application traffic flows inaccurately belonging to a given application,
    - the true negative (TN) is defined as a number of Internet application traffic flows accurately classified into another application, and
    - the false negative (FN) is defined as a number of Internet application traffic flows inaccurately classified into another application;

a traffic classifier connected with the pre/post-processor to manage and execute each plug-in configured to each network traffic classification wherein the classifier includes
- a classification execution unit identifying and classifying applications related to transaction flow,
- a plug-in management unit connected with the classification execution unit to allocate two or more network traffic classifications to the plug-ins, and to add, modify, and remove the plug-in, and
- a database management unit connected with the plug-in management unit to manage data of the storage and enable storing or accessing a plurality of records sequentially or randomly; and a storage connected with the user interface and the traffic classifier to store performance analysis results depending on an execution of the plug-in.

8. The apparatus of claim 7, wherein the pre-processing unit includes:
- an input format converting unit connected with the input unit to convert an input format of the plug-in;
- a feature selecting unit connected with the input format converting unit to select a feature of a traffic flow; and
- a feature discretizing unit connected with the feature selecting unit to change continuous data to discrete data.

9. An apparatus for benchmarking network traffic classifications, comprising:
- a user interface that receives a network traffic trace data and displays an evaluation result;
- a pre/post-processor that receives the network traffic trace data from the user interface and converts the network traffic trace data into formats suitable for each of a plurality of classification plug-ins into a converted network traffic trace data; and
- a traffic classifier that receives the converted network traffic trace data, and executes each of the plurality of classification plug-ins in connection with the converted network traffic trace data to produce a classification result,
- wherein the pre/post processor evaluates the classification result of the execution of each of the plurality of classification plug-ins in connection with the converted network traffic trace data to calculate a set of performance metrics, the set of performance metrics including overall accuracy, precision, recall and F-measure.

10. The apparatus of claim 9, wherein the pre/post processor calculates
- overall accuracy by calculating a ratio, of the sum of all True Positives (TPs), to the sum of all TPs and False Positives (FPs), for the classification results for all of the plurality of classification plug-ins;
- precision of the classification method for a predetermined Internet application category by calculating a ratio, of the true positive (TP), to the sum of the true positive (TP) and the false positive (FP), for each classification plug-in,
- recall of the classification method for a predetermined Internet application category by calculating a ratio, of the true positive (TP), to the sum of the true positive (TP) and the false negative (FN), for each classification plug-in, and
- F-measure by double-multiplying the precision and the recall with respect to a sum of the precision and the recall, wherein the true positive (TP) is defined as a number of Internet application traffic flows accurately classified for a predetermined application, the false positive (FP) is defined as a number of Internet application traffic flows inaccurately belonging to a given application, and the false negative (FN) is defined as a number of Internet application traffic flows inaccurately classified into another application.

11. The apparatus of claim 9, wherein the classifier includes a classification execution unit identifying and classifying applications related to transaction flow;

a plug-in management unit to add, modify, and remove the plurality of classification plug-ins; and a database management unit to manage storage of the classification results.

12. The apparatus of claim 9, wherein CRL_PAY is one of the plurality of classification plug-ins.

13. The apparatus of claim 9, wherein the plurality of classification plug-ins is selected from the group consisting of CRL_PAY, Coral Reef, BLINC, WEKA, GRAPTION and user-made plug-ins.

14. The apparatus of claim 9, further comprising a storage that stores the set of performance metrics.

15. A method of benchmarking network traffic classifications, comprising receiving network traffic trace data;

converting the network traffic trace data into formats suitable for each of a plurality of classification plug-ins;

executing the plurality of classification plug-ins in connection with the network traffic trace data;

evaluating classification results from each of the plurality of the classification plug-ins;

calculating a set of performance metrics including overall accuracy, precision, recall and F-measure based on the classification results; and storing the set of performance metrics in a database.

16. The method of claim 15, wherein the calculating includes calculating a ratio, of the sum of all True Positives (TPs), to the sum of all TPs and False Positives (FPs), for the classification results for all of the plurality of classification plug-ins to evaluate overall accuracy;

calculating a ratio, of the true positive (TP), to the sum of the true positive (TP) and the false positive (FP), for each classification plug-in to evaluate precision of the classification method for a predetermined Internet application category, calculating a ratio, of the true positive (TP), to the sum of the true positive (TP) and the false negative (FN), for each classification plug-in to evaluate recall of the classification method for a predetermined Internet application category, and F-measure by double-multiplying the precision and the recall with respect to a sum of the precision and the recall, wherein the true positive (TP) is defined as a number of Internet application traffic flows accurately classified for a predetermined application, the false positive (FP) is defined as a number of Internet application traffic flows inaccurately belonging to a given application, and the false negative (FN) is defined as a number of Internet application traffic flows inaccurately classified into another application.

17. The method of claim 15, further comprising comparing the set of performance metrics from each of the plurality of classification plug-ins with the set of performance metrics from a benchmark plug-in.

18. The method of claim 15, further comprising prioritizing the classification results from each of the plurality of classification plug-ins.

19. The method of claim 15, wherein CRL_PAY is one of the plurality of classification plug-ins.

20. The method of claim 15, wherein the plurality of classification plug-ins is selected from the group consisting of CRL_PAY, Coral Reef, BLINC, WEKA, GRAPTION and user-made plug-ins.

* * * * *